United States Patent
Nagao et al.

(10) Patent No.: US 9,359,473 B2
(45) Date of Patent: Jun. 7, 2016

(54) METHOD FOR CONTINUOUS PRODUCTION OF POLYCARBONATE-POLYORGANOSILOXANE COPOLYMER

(71) Applicant: IDEMITSU KOSAN CO., LTD., Chiyoda-ku (JP)

(72) Inventors: Yukiko Nagao, Ichihara (JP); Yasuhiro Ishikawa, Ichihara (JP); Hiroaki Motegi, Ichihara (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 14/434,486

(22) PCT Filed: Oct. 10, 2013

(86) PCT No.: PCT/JP2013/077673
§ 371 (c)(1),
(2) Date: Apr. 9, 2015

(87) PCT Pub. No.: WO2014/058033
PCT Pub. Date: Apr. 17, 2014

(65) Prior Publication Data
US 2015/0267003 A1  Sep. 24, 2015

(30) Foreign Application Priority Data

Oct. 12, 2012  (JP) ................. 2012-227471

(51) Int. Cl.
| | | |
|---|---|---|
| C08G 64/18 | (2006.01) |
| C08G 77/448 | (2006.01) |
| C08G 64/24 | (2006.01) |
| C08G 77/04 | (2006.01) |
| C08G 64/20 | (2006.01) |

(52) U.S. Cl.
CPC ............ *C08G 64/186* (2013.01); *C08G 64/205* (2013.01); *C08G 64/24* (2013.01); *C08G 77/04* (2013.01); *C08G 77/448* (2013.01)

(58) Field of Classification Search
None
See application file for complete search history.

(56) References Cited

U.S. PATENT DOCUMENTS

| 9,045,586 B2 | 6/2015 | Ishikawa et al. | |
|---|---|---|---|
| 2003/0027928 A1 | 2/2003 | Okamoto et al. | |
| 2014/0256888 A1* | 9/2014 | Ishikawa ............... C08L 69/00 525/464 |
| 2014/0316077 A1 | 10/2014 | Ishikawa et al. | |
| 2015/0166733 A1 | 6/2015 | Nagao et al. | |

FOREIGN PATENT DOCUMENTS

| CN | 104395373 A | 3/2015 |
|---|---|---|
| EP | 0 595 141 A1 | 10/1993 |
| JP | 6 329781 | 11/1994 |
| JP | 9 208685 | 8/1997 |
| JP | 2001 2907 | 1/2001 |
| JP | 2005 60599 | 3/2005 |
| JP | 2008 37965 | 2/2008 |
| JP | 2009 280636 | 12/2009 |
| WO | WO 2013/058214 A1 * | 4/2013 |

OTHER PUBLICATIONS

International Search Report issued Jan. 21, 2014, in PCT/JP13/077673 filed Oct. 10, 2013.
Chinese Office Action issued Feb. 23, 2016 in corresponding Japanese patent application No. 201380052733, 7 pp.
Extended European Search Report issued in 13846019.1, dated Mar. 16, 2016, 6 pp.

* cited by examiner

*Primary Examiner* — Marc Zimmer
(74) *Attorney, Agent, or Firm* — Oblon, McClelland, Maier & Neustadt, L.L.P.

(57) ABSTRACT

Provided is a method for economically and stably producing a high-quality polycarbonate-polyorganosiloxane copolymer excellent in, for example, transparency and impact resistance in a continuous manner. Specifically, provided is a method of continuously producing a polycarbonate-polyorganosiloxane copolymer, the method including a step (A) of continuously or intermittently taking a polymerization reaction liquid, which is obtained by polymerizing a dihydric phenol-based compound, a carbonate precursor, and a polyorganosiloxane in the presence of an alkaline compound aqueous solution and a water-insoluble organic solvent, out of a reactor, the step (A) including the following step (a-1) and the following step (a-2), the method using a dissolution tank for dissolving the dihydric phenol-based compound in the alkaline compound aqueous solution to prepare an alkaline compound aqueous solution of the dihydric phenol-based compound to be used in each of both the step (a-1) and the step (a-2), the step (a-2) including, before mixing a polycarbonate oligomer and the dihydric phenol-based compound, mixing the alkaline compound aqueous solution and the alkaline compound aqueous solution of the dihydric phenol-based compound prepared in the dissolution tank: step (a-1): a step of mixing the alkaline compound aqueous solution of the dihydric phenol-based compound prepared in the dissolution tank and the polycarbonate precursor, followed by a reaction of the mixture in the presence of the water-insoluble organic solvent to produce the polycarbonate oligomer; and step (a-2): a step of continuously or intermittently taking the polymerization reaction liquid, which is obtained by mixing the alkaline compound aqueous solution of the dihydric phenol-based compound prepared in the dissolution tank, the polycarbonate oligomer obtained in the step (a-1), and the polyorganosiloxane, and polymerizing the mixture in the presence of the water-insoluble organic solvent, out of the reactor.

11 Claims, 1 Drawing Sheet

METHOD FOR CONTINUOUS PRODUCTION OF POLYCARBONATE-POLYORGANOSILOXANE COPOLYMER

TECHNICAL FIELD

The present invention relates to a method for continuously producing a polycarbonate-polyorganosiloxane copolymer.

BACKGROUND ART

A polycarbonate-based resin is a polymer excellent in transparency, heat resistance, and impact resistance and is widely used at present as an engineering plastic in the industrial field.

As a method for producing the polycarbonate-based resin, a method involving allowing an aromatic dihydroxy compound such as bisphenol A, and phosgene to react directly with each other (interfacial polymerization method) is known as a method of producing a high-quality polycarbonate.

As a method for industrially producing a polycarbonate by an interfacial condensation polymerization method, in general, there is adopted a method involving bubbling phosgene into an alkali aqueous solution of a bisphenol to form a polycarbonate oligomer having a reactive chloroformate group, and further mixing the polycarbonate oligomer and the alkali aqueous solution of the bisphenol to perform a condensation reaction (polymerization reaction) in the presence of a polymerization catalyst such as a tertiary amine. From the viewpoints of solubility, handleability, and the like, methylene chloride is mainly used as the water-insoluble organic solvent on an industrial scale.

The bisphenol as a raw material monomer is typically supplied after having been dissolved in aqueous sodium hydroxide. Accordingly, the sodium hydroxide concentration of the resultant solution is adjusted to a predetermined value in a dissolution tank for dissolving the bisphenol in the aqueous sodium hydroxide, and the solution is fed to each of a step of producing the polycarbonate oligomer and a step of producing a polycarbonate copolymer (see Patent Document 1). The concentration of the bisphenol and the concentration of sodium hydroxide at this time are extremely important in terms of the control of the reaction for the production of the polycarbonate oligomer. Meanwhile, upon production of the polycarbonate copolymer from the oligomer, the optimum sodium hydroxide concentration differs from that of the solution of the bisphenol in the aqueous sodium hydroxide used in the production of the polycarbonate oligomer, and hence the aqueous sodium hydroxide is typically further added in a supply tube immediately in front of a reactor for polymer production.

It should be noted that, among the polycarbonate-based resins, a polycarbonate-polyorganosiloxane polymer (hereinafter sometimes referred to as "PC-POS") has been attracting attention because of its high impact resistance, high chemical resistance, and high flame retardancy, and the polymer has been expected to find utilization in a wide variety of fields such as the field of electrical and electronic equipment and the field of an automobile. As a method of producing the PC-POS, there is known a method involving allowing a dihydric phenol-based compound and phosgene to react with each other to produce a polycarbonate oligomer, and polymerizing the polycarbonate oligomer with a polyorganosiloxane in the presence of methylene chloride, an alkaline compound aqueous solution, a dihydric phenol-based compound, and a polymerization catalyst (interfacial polycondensation method) (see Patent Document 2).

CITATION LIST

Patent Document

[Patent Document 1] JP 09-208685 A
[Patent Document 2] JP 06-329781 A

SUMMARY OF INVENTION

Technical Problem

In the case of the production of the PC-POS as well, the bisphenol as a raw material monomer is typically supplied after having been dissolved in the aqueous sodium hydroxide. Accordingly, the sodium hydroxide concentration of the resultant solution is adjusted to a predetermined value in a dissolution tank for dissolving the bisphenol in the aqueous sodium hydroxide, and the solution is fed to each of a step of producing the polycarbonate oligomer and a step of producing the polymer (PC-POS). In addition, the optimum sodium hydroxide concentration differs from that of the solution of the bisphenol in the aqueous sodium hydroxide used in the production of the polycarbonate oligomer, and hence the aqueous sodium hydroxide is typically further added in a supply tube immediately in front of a reactor for polymer production.

It has been found, however, that when such a production method is adopted as it is in the case of the production of the PC-POS, there occur quality deterioration problems such as a reduction in transparency of a product and a reduction in impact resistance thereof. Further studies made by the inventors of the present invention have also found that the amount of an unreacted polydimethylsiloxane (hereinafter referred to as "PDMS") increases. The inventors of the present invention have assumed that the unreacted PDMS causes the above problems, and hence the development of a method of reducing the amount of the unreacted PDMS in the production of the PC-POS has been earnestly desired.

In view of the foregoing, an object of the present invention is to provide a method for economically and stably producing a high-quality polycarbonate-polyorganosiloxane copolymer excellent in, for example, transparency and impact resistance.

Solution to Problem

As a result of their extensive studies, the inventors of the present invention have found that when, in a step of producing a PC-POS from a polycarbonate oligomer, the concentration of an alkaline compound with respect to a dihydric phenol-based compound is increased by mixing, before an alkaline compound aqueous solution of the dihydric phenol-based compound fed from a dissolution tank for the dihydric phenol-based compound comes into contact with the polycarbonate oligomer and a PDMS, the alkaline compound aqueous solution, the amount of an unreacted PDMS reduces, and hence a high-quality polycarbonate-polyorganosiloxane copolymer excellent in, for example, transparency and impact resistance can be economically and stably produced.

That is, the present invention relates to the following items [1] to [8].

[1] A method for continuously producing a polycarbonate-polyorganosiloxane copolymer, the method comprising a step (A) of continuously or intermittently taking a polymerization reaction liquid, which is obtained by polymerizing a dihydric phenol-based compound, a carbonate precursor, and a polyorganosiloxane in a presence of an alkaline compound aqueous solution and a water-insoluble organic solvent, out of a reactor, the step (A) including the following step (a-1) and the following step (a-2), the method using a dissolution tank for dissolving the dihydric phenol-based compound in the alkaline compound aqueous solution to prepare an alkaline compound aqueous solution of the dihydric phenol-based compound to be used in each of both the step (a-1) and the step (a-2), and the step (a-2) comprising, before mixing a polycarbonate oligomer and the dihydric phenol-based compound, mixing the alkaline compound aqueous solution and the alkaline compound aqueous solution of the dihydric phenol-based compound prepared in the dissolution tank:

step (a-1): a step of mixing the alkaline compound aqueous solution of the dihydric phenol-based compound prepared in the dissolution tank and the polycarbonate precursor, followed by a reaction of the mixture in the presence of the water-insoluble organic solvent to produce the polycarbonate oligomer; and step (a-2): a step of continuously or intermittently taking the polymerization reaction liquid, which is obtained by mixing the alkaline compound aqueous solution of the dihydric phenol-based compound prepared in the dissolution tank, the polycarbonate oligomer obtained in the step (a-1), and the polyorganosiloxane, and polymerizing the mixture in the presence of the water-insoluble organic solvent, out of the reactor.

[2] The method for continuously producing a polycarbonate-polyorganosiloxane copolymer according to item [1], wherein in the dissolution tank, the alkaline compound aqueous solution of the dihydric phenol-based compound having a concentration of the dihydric phenol-based compound of 8 to 20% by mass and a concentration of an alkaline compound of 3 to 10% by mass is prepared.

[3] The method for continuously producing a polycarbonate-polyorganosiloxane copolymer according to item [1] or [2], wherein in the step (a-2), in an aqueous solution obtained by mixing the alkaline compound aqueous solution and the alkaline compound aqueous solution of the dihydric phenol-based compound prepared in the dissolution tank, a concentration of the dihydric phenol-based compound is 5 to 12% by mass and a concentration of an alkaline compound is 5 to 20% by mass.

[4] The method for continuously producing a polycarbonate-polyorganosiloxane copolymer according to any one of items [1] to [3], wherein in the step (a-2), a water content, in a mixed liquid obtained by mixing the alkaline compound aqueous solution of the dihydric phenol-based compound prepared in the dissolution tank, the polycarbonate oligomer obtained in the step (a-1), the polyorganosiloxane and the water-insoluble organic solvent, is 35% by volume or less.

[5] The method for continuously producing a polycarbonate-polyorganosiloxane copolymer according to any one of items [1] to [4], wherein in the step (a-2), the polymerizing is performed in a mixer provided with a turbine blade.

[6] The method for continuously producing a polycarbonate-polyorganosiloxane copolymer according to any one of items [1] to [5], wherein the dihydric phenol-based compound is represented by the following general formula (1) and the polyorganosiloxane is represented by the following general formula (2):

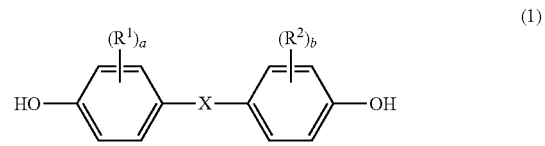

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, and a and b each independently represent an integer of 0 to 4;

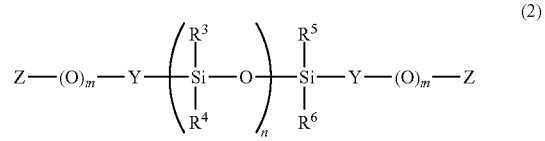

wherein $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, Y represents a single bond, or an organic residue including an aliphatic or aromatic moiety, n represents an average number of repetitions, Z represents a halogen atom, —$R^7$OH, —$R^7$—Z'—$R^8$—OH, —$R^7$COOH, —$R^7$NH$_2$, —COOH, or —SH, the $R^7$ represents a substituted or unsubstituted alkylene group, a substituted or unsubstituted cycloalkylene group, or a substituted or unsubstituted arylene group, the $R^8$ represents an arylene group having 6 to 12 ring-forming carbon atoms, the Z' represents an alkylene group having 1 to 8 carbon atoms, an alkylidene group having 2 to 8 carbon atoms, a cycloalkylene group having 5 to 10 carbon atoms, or a cycloalkylidene group having 5 to 10 carbon atoms, and m represents 0 or 1.

[7] The method for continuously producing a polycarbonate-polyorganosiloxane copolymer according to any one of items [1] to [6], wherein n in the general formula (2) represents 25 to 120.

[8] The method for continuously producing a polycarbonate-polyorganosiloxane copolymer according to any one of items [1] to [6], wherein n in the general formula (2) represents 70 to 120.

Advantageous Effects of Invention

According to the present invention, it is possible to provide the method of economically and stably producing a high-quality polycarbonate-polyorganosiloxane copolymer excellent in, for example, transparency and impact resistance, the method being capable of reducing the amount of the unreacted polydimethylsiloxane.

DESCRIPTION OF EMBODIMENTS

Figure 1:
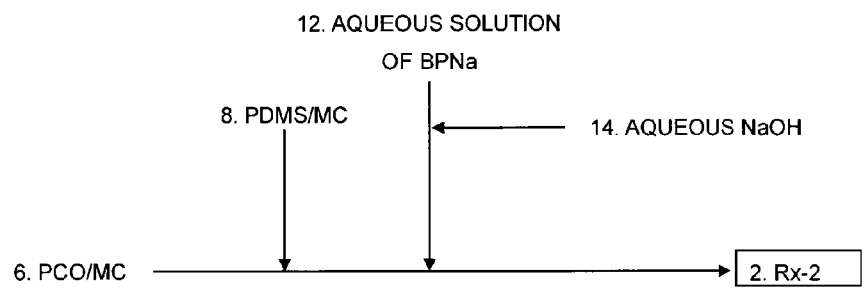
FIG. 1 is a schematic view illustrating an embodiment of a step (a-2) in the present invention.

First, in the description, a preferred definition can be arbitrarily adopted, and a combination of preferred definitions can be said to be more preferred.

The present invention is a method for continuously producing a polycarbonate-polyorganosiloxane copolymer, the method including a step (A) of continuously or intermittently taking a polymerization reaction liquid, which is obtained by polymerizing a dihydric phenol-based compound, a carbonate precursor, and a polyorganosiloxane in the presence of an alkaline compound aqueous solution and a water-insoluble organic solvent, out of a reactor, the step (A) including the following step (a-1) and the following step (a-2), the method using a dissolution tank for dissolving the dihydric phenol-based compound in the alkaline compound aqueous solution to prepare an alkaline compound aqueous solution of the dihydric phenol-based compound to be used in each of both the step (a-1) and the step (a-2), and the step (a-2) including, before mixing a polycarbonate oligomer and the dihydric phenol-based compound, mixing the alkaline compound aqueous solution and the alkaline compound aqueous solution of the dihydric phenol-based compound prepared in the dissolution tank.

Step (a-1): a step of mixing the alkaline compound aqueous solution of the dihydric phenol-based compound prepared in the dissolution tank and the polycarbonate precursor, followed by a reaction of the mixture in the presence of the water-insoluble organic solvent to produce the polycarbonate oligomer.

Step (a-2): a step of continuously or intermittently taking the polymerization reaction liquid, which is obtained by mixing the alkaline compound aqueous solution of the dihydric phenol-based compound prepared in the dissolution tank, the polycarbonate oligomer obtained in the step (a-1), and the polyorganosiloxane, and polymerizing the mixture in the presence of the water-insoluble organic solvent, out of the reactor.

A compound represented by the following general formula (1) is preferred as the dihydric phenol-based compound.

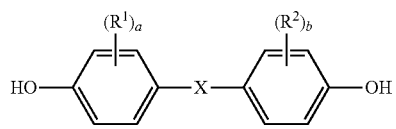

(1)

wherein, $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, and a and b each independently represent an integer of 0 to 4.

A compound represented by the following general formula (2) is preferred as the polyorganosiloxane.

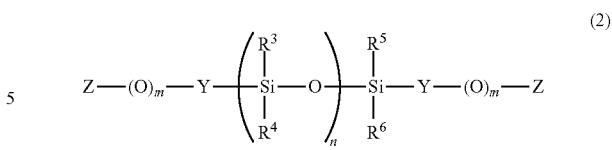

(2)

wherein, $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, Y represents a single bond, or an organic residue including an aliphatic or aromatic moiety, n represents an average number of repetitions, Z represents a halogen atom, —R$^7$OH, —R$^7$—Z'—R$^8$—OH, —R$^7$COOH, —R$^7$NH$_2$, —COOH, or —SH, R$^7$ represents a substituted or unsubstituted alkylene group, a substituted or unsubstituted cycloalkylene group, or a substituted or unsubstituted arylene group, the R$^8$ represents an arylene group having 6 to 12 ring-forming carbon atoms, the Z' represents an alkylene group having 1 to 8 carbon atoms, an alkylidene group having 2 to 8 carbon atoms, a cycloalkylene group having 5 to 10 carbon atoms, or a cycloalkylidene group having 5 to 10 carbon atoms, and m represents 0 or 1.

Examples of the halogen atom that $R^1$ and $R^2$ in the general formula (1) each independently represent include a fluorine atom, a chlorine atom, a bromine atom, and an iodine atom.

Examples of the alkyl group that $R^1$ and $R^2$ each independently represent include a methyl group, an ethyl group, a n-propyl group, an isopropyl group, various butyl groups ("various" means that a linear group and any branched group are included, and the same shall apply hereafter), various pentyl groups, and various hexyl groups. An example of the alkoxy group that $R^1$ and $R^2$ each independently represent is an alkoxy group whose alkyl group moiety is the alkyl group described above.

The alkylene group represented by X is, for example, a methylene group, an ethylene group, a trimethylene group, a tetramethylene group, or a hexamethylene group, and is preferably an alkylene group having 1 to 5 carbon atoms. Examples of the alkylidene group represented by X include an ethylidene group and an isopropylidene group. The cycloalkylene group represented by X is, for example, a cyclopentanediyl group, a cyclohexanediyl group, or a cyclooctanediyl group, and is preferably a cycloalkylene group having 5 to 10 carbon atoms. The cycloalkylidene group represented by X is, for example, a cyclohexylidene group, a 3,5,5-trimethylcyclohexylidene group, or a 2-adamantylidene group, and is preferably a cycloalkylidene group having 5 to 10 carbon atoms, more preferably a cycloalkylidene group having 5 to 8 carbon atoms.

a and b each independently represent an integer of 0 to 4, preferably 0 to 2, more preferably 0 or 1.

Examples of the halogen atom that $R^3$ to $R^6$ in the general formula (2) each independently represent include a fluorine atom, a chlorine atom, a bromine atom, and an iodine atom. Examples of the alkyl group or alkoxy group that $R^3$ to $R^6$ each independently represent include the same examples as those in the cases of $R^1$ and $R^2$. Examples of the aryl group that $R^3$ to $R^6$ each independently represent include a phenyl group and a naphthyl group.

The organic residue including an aliphatic moiety represented by Y is, for example, an alkylene group having 1 to 10 carbon atoms (preferably 1 to 6 carbon atoms, more preferably 1 to 3 carbon atoms). In addition, examples of the organic residue including an aromatic moiety represented by Y include arylene groups each having 6 to 12 ring-forming carbon atoms such as a phenylene group, a naphthylene group, and a biphenyldiyl group.

Examples of the halogen atom represented by Z in the general formula (2) include a fluorine atom, a chlorine atom, a bromine atom, and an iodine atom. Among them, a chlorine atom is preferred.

Examples of the alkylene group represented by $R^7$ in $-R^7OH$, $-R^7-Z'-R^8-OH$, $-R^7COOH$, and $-R^7NH_2$ each represented by Z include alkylene groups each having 1 to 10 (preferably 1 to 5) carbon atoms such as a methylene group, an ethylene group, a propylene group, a trimethylene group, and a pentamethylene group. In addition, examples of the cycloalkylene group represented by $R^7$ include cycloalkylene groups each having 3 to 10 (preferably 4 to 8) ring-forming carbon atoms such as a cyclopentylene group and a cyclohexylene group. Examples of the arylene group represented by $R^7$ include arylene groups each having 6 to 12 ring-forming carbon atoms such as a phenylene group, a naphthylene group, and a biphenyldiyl group.

$R^7$ may be substituted with an alkyl group having 1 to 5 carbon atoms, an alkoxy group having 1 to 5 carbon atoms, an aryl group having 6 to 12 ring-forming carbon atoms, or the like. Examples of the alkyl group include a methyl group, an ethyl group, a propyl group, and various butyl groups. An example of the alkoxy group is an alkoxy group whose alkyl group moiety is the alkyl group described above. An example of the aryl group is a phenyl group.

Examples of the arylene group represented by $R^8$ include a phenylene group, a methoxy-substituted phenylene group, a naphthylene group, and a biphenylylene group.

Examples of the alkylene group, alkylidene group, cycloalkylene group, or cycloalkylidene group represented by Z' include the same examples as those in the case of X. Z' represents preferably an alkylidene group having 2 to 8 carbon atoms, more preferably an isopropylidene group.

Examples of the dihydric phenol-based compound include: bis(hydroxyaryl)alkanes such as 2,2-bis(4-hydroxyphenyl)propane [trivial name: bisphenol A], bis(4-hydroxyphenyl)methane, 1,1-bis(4-hydroxyphenyl)ethane, 2,2-bis(4-hydroxyphenyl)butane, 2,2-bis(4-hydroxyphenyl)octane, bis(4-hydroxyphenyl)phenylmethane, bis(4-hydroxyphenyl)diphenylmethane, 2,2-bis(4-hydroxy-3-methylphenyl)propane, bis(4-hydroxyphenyl)naphthylmethane, 1,1-bis(4-hydroxy-t-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane, and 2,2-bis(4-hydroxy-3,5-dibromophenyl)propane; bis(hydroxyaryl)cycloalkanes such as 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane, 2,2-bis(4-hydroxyphenyl)norbornane, and 1,1-bis(4-hydroxyphenyl)cyclododecane; dihydroxyaryl ethers such as 4,4'-dihydroxydiphenyl ether and 4,4'-dihydroxy-3,3'-dimethylphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; dihydroxydiaryl sulfones such as 4,4'-dihydroxydiphenyl sulfone and 4,4'-dihydroxy-3,3'-dimethyldiphenyl sulfone; dihydroxydiphenyls such as 4,4'-dihydroxydiphenyl; dihydroxydiarylfluorenes such as 9,9-bis(4-hydroxyphenyl)fluorene and 9,9-bis(4-hydroxy-3-methylphenyl)fluorene; dihydroxydiaryladamantanes such as 1,3-bis(4-hydroxyphenyl)adamantane, 2,2-bis(4-hydroxyphenyl)adamantane, and 1,3-bis(4-hydroxyphenyl)-5,7-dimethyladamantane; 4,4'-[1,3-phenylenebis(1-methylethylidene)]bisphenol; 10,10-bis(4-hydroxyphenyl)-9-anthrone; and 1,5-bis(4-hydroxyphenylthio)-2,3-dioxapentaene. Among them, 2,2-bis(4-hydroxyphenyl)propane [trivial name: bisphenol A] is preferred.

One kind of those dihydric phenol-based compounds may be used alone, or two or more kinds thereof may be used as a mixture.

Examples of the carbonate precursor include carbonyl halides, carbonic acid diesters and haloformates, and specific examples thereof include phosgene, diphenyl carbonate and a dihaloformate of a dihydric phenol-based compound. Among them, phosgene is preferred.

The polyorganosiloxane can be easily produced by subjecting a phenol having an olefinically unsaturated carbon-carbon bond (preferably, for example, vinylphenol, allylphenol, eugenol, or isopropenylphenol) to a hydrosilanation reaction with a terminal of a polyorganosiloxane chain having a predetermined polymerization degree n. The phenol is more preferably allylphenol or eugenol. In this case, Y in the general formula (2) represents an organic residue derived from allylphenol or eugenol.

Examples of the polyorganosiloxane include the following.

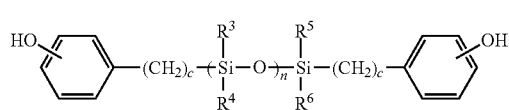

(3)

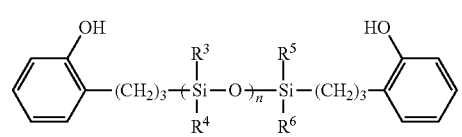

(4)

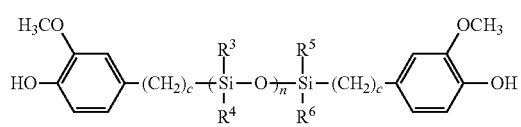

(5)

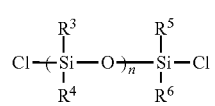

(6)

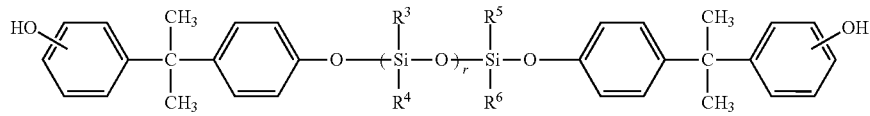

(7)

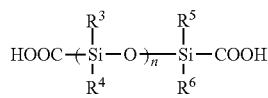

(8)

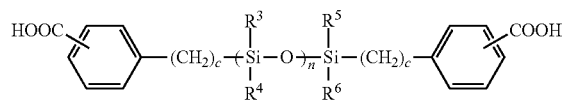

(9)

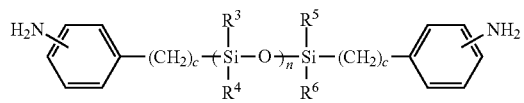

(10)

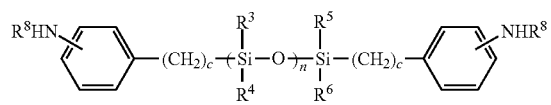

(11)

In the general formulae (3) to (11), $R^3$ to $R^6$ are the same as $R^3$ to $R^6$ in the general formula (1). n is the same as n in the general formula (2). In addition, c represents a positive integer and is preferably an integer of 1 to 6, more preferably an integer of 1 to 3, still more preferably 3.

Among them, the phenol-modified polyorganosiloxane represented by the general formula (3) (preferably c=3) is preferred from the viewpoint of easiness of polymerization. Further, α,ω-bis[3-(o-hydroxyphenyl)propyl]polydimethylsiloxane, which is one of the compound represented by the general formula (4), or α,ω-bis[3-(4-hydroxy-3-methoxyphenyl)propyl]polydimethylsiloxane, which is one of the compound represented by the general formula (5), is preferred from the viewpoint of easiness of availability.

The phenol-modified polyorganosiloxane can be produced by a known method. For example, the following is available as the known production method.

Cyclotrisiloxane and disiloxane are allowed to react with each other in the presence of an acid catalyst to synthesize an α,ω-dihydrogen organopolysiloxane. At this point, an α,ω-dihydrogen organopolysiloxane having a desired average repeating unit can be synthesized by changing a loading ratio between cyclotrisiloxane and disiloxane. Next, the α,ω-dihydrogen organopolysiloxane is subjected to an addition reaction with a phenol compound having an unsaturated aliphatic hydrocarbon group such as allylphenol or eugenol in the presence of a catalyst for a hydrosilylation reaction, whereby a phenol-modified polyorganosiloxane having a desired average repeating unit can be produced.

In addition, at this stage, a cyclic polyorganosiloxane having a low molecular weight and an excessive amount of the phenol compound remain as impurities. Accordingly, those low-molecular weight compounds are removed by evaporation through heating under reduced pressure.

(Polycarbonate-Polyorganosiloxane Copolymer: PC-POS)

A PC-POS obtained by the production method of the present invention has a repeating unit represented by the following general formula (I) and a constituent unit represented by the following general formula (II):

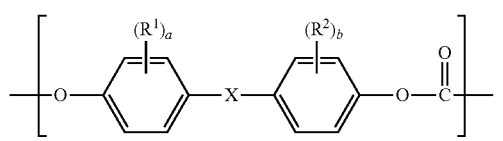

(I)

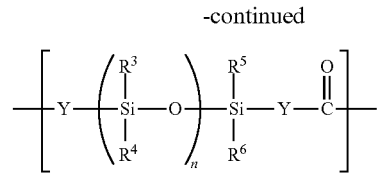

(II)

wherein $R^1$ to $R^6$, X, Y, a, b, and n are the same as defined above, and preferred groups and values thereof are also the same.

In the PC-POS, the content of the constituent unit represented by the general formula (II) is not particularly limited, but is preferably 1 to 25% by mass, more preferably 2 to 10% by mass. When the content is 1% by mass or more, the impact resistance is excellent, and when the content is 25% by mass or less, the heat resistance is satisfactory.

In addition, in the PC-POS, the average number n of repetitions in the constituent unit represented by the general formula (II) is preferably 25 to 120. In the PC-POS, when n represents 25 or more, the impact resistance is excellent, and when n represents 120 or less, the transparency is satisfactory. n represents more preferably 70 to 120, still more preferably 80 to 110, particularly preferably 80 to 95 from the viewpoint of a balance between the impact resistance and the transparency, and from the viewpoint of reactivity.

Here, an upper limit for n is preferably 65, more preferably 50 from the viewpoint of the reactivity and from the viewpoint of obtaining high transparency corresponding to a total light transmittance of 88% or more. In addition, a lower limit for n is preferably 28, more preferably 30, still more preferably 35 from the viewpoint of the impact resistance. Any combination can be adopted for the upper limit and lower limit for n, and a combination of preferred values is more preferred. It should be noted that high reactivity leads to a reduction in amount of an unreacted PDMS and hence leads to an improvement in impact resistance of the PC-POS, in particular, an improvement in impact resistance thereof at low temperature.

The viscosity-average molecular weight (Mv) of the PC-POS is not particularly limited, but is preferably 10,000 to 30,000, more preferably 13,000 to 25,000, still more preferably 15,000 to 23,000, particularly preferably 15,000 to 21,000. When the viscosity-average molecular weight of the PC-POS falls within the range, the strength of a molded article is sufficient, the viscosity of the copolymer does not become excessively large, and the productivity at the time of production is stable.

[Method for Producing Polycarbonate-Polyorganosiloxane Copolymer]

As described above, the method for producing a polycarbonate-polyorganosiloxane copolymer (PC-POS) according to the present invention includes the following step (A).

(Step (A))

The step (A) is a step of continuously or intermittently taking a polymerization reaction liquid, which is obtained by polymerizing a dihydric phenol-based compound, a carbonate precursor, and a polyorganosiloxane in the presence of an alkaline compound aqueous solution and a water-insoluble organic solvent, out of a reactor.

In the step (A), the polymerization can also be performed in the presence of a polymerization catalyst and a molecular weight modifier, as necessary. The alkaline compound aqueous solution, the water-insoluble organic solvent, the polymerization catalyst, and the molecular weight modifier are described below.

Further, a production line for the method for producing a PC-POS of the present invention has a "dissolution tank" for preparing an alkaline compound aqueous solution of the dihydric phenol-based compound to be used in each of both a step (a-1) and step (a-2) to be described later, in other words, a dissolution tank for dissolving the dihydric phenol-based compound in the alkaline compound aqueous solution. In other words, in the production method of the present invention, the alkaline compound aqueous solutions of the dihydric phenol-based compound having the same concentration are fed from the dissolution tank to both the step (a-1) and the step (a-2). The number of the dissolution tanks is preferably 1 from the viewpoint of a production cost.

The concentration of the dihydric phenol-based compound in the alkaline compound aqueous solution of the dihydric phenol-based compound to be prepared in the dissolution tank is preferably 8 to 20% by mass, more preferably 10 to 18% by mass, still more preferably 11 to 16% by mass, particularly preferably 12 to 15% by mass from the viewpoint of the control of a reaction for the production of a polycarbonate oligomer and from the viewpoint of suppressing the precipitation of a divalent salt of the dihydric phenol-based compound. In addition, the concentration of an alkaline compound therein is preferably 3 to 10% by mass, more preferably 4 to 8% by mass, still more preferably 4.5 to 7% by mass, particularly preferably 5 to 6% by mass from the viewpoint of the control of the reaction for the production of the polycarbonate oligomer and from the viewpoint of suppressing the precipitation of the divalent salt of the dihydric phenol-based compound.

From the viewpoint of increasing the transparency of the PC-POS, the step (A) includes the following step (a-1) and the following step (a-2):

step (a-1): a step of mixing the alkaline compound aqueous solution of the dihydric phenol-based compound prepared in the dissolution tank and the polycarbonate precursor, followed by a reaction of the mixture in the presence of the water-insoluble organic solvent to produce the polycarbonate oligomer; and step (a-2): a step of continuously or intermittently taking the polymerization reaction liquid, which is obtained by mixing the alkaline compound aqueous solution of the dihydric phenol-based compound prepared in the dissolution tank, the polycarbonate oligomer obtained in the step (a-1), and the polyorganosiloxane, and polymerizing the mixture in the presence of the water-insoluble organic solvent, out of the reactor.

(Step (a-1))

In the step (a-1), the reaction between the dihydric phenol-based compound and the carbonate precursor is not particularly limited, a known method can be adopted, and it is preferred to carry out the reaction in the presence of a water-insoluble organic solvent by the interfacial polymerization method. As necessary, the reaction can also be carried out in the presence of a polymerization catalyst, and it is preferred that the reaction be carried out in such a manner. Although the alkaline compound aqueous solution of the dihydric phenol-based compound prepared in the dissolution tank is used as the dihydric phenol-based compound, the concentration of the solution may be appropriately adjusted by adding an alkaline compound aqueous solution having a concentration as high as 15 to 30% by mass (preferably 20 to 30% by mass) or water, or at least part of the unreacted dihydric phenol-based compound remaining in the final step may be reused.

Examples of the alkaline compound include alkaline inorganic compounds such as: alkali metal hydroxides such as sodium hydroxide and potassium hydroxide; and alkaline earth metal hydroxides such as magnesium hydroxide and calcium hydroxide. Among them, an alkali metal hydroxide is preferred, and sodium hydroxide is more preferred. It should be noted that the dihydric phenol-based compound is preferably used as a mixture with the alkaline compound aqueous solution.

As the water-insoluble organic solvent, for example, a halogenated hydrocarbon such as methylene chloride, chlorobenzene or chloroform is preferred, and methylene chloride is more preferred.

Examples of the polymerization catalyst include tertiary amines and quaternary ammonium salts. Examples of the tertiary amine include trimethylamine, triethylamine, and tripropylamine. Examples of the quaternary ammonium salt include trimethylbenzylammonium chloride and triethylammonium chloride.

As the polymerization catalyst, a tertiary amine is preferred, and triethylamine is more preferred.

In the step (a-1), a molecular weight modifier may be used, as necessary. The molecular weight modifier is not particularly limited so long as the modifier is a monohydric phenol, and examples thereof include phenol, o-n-butylphenol, m-n-butylphenol, p-n-butylphenol, o-isobutylphenol, m-isobutylphenol, p-isobutylphenol, o-t-butylphenol, m-t-butylphenol, p-t-butylphenol, o-n-pentylphenol, m-n-pentylphenol, p-n-pentylphenol, o-n-hexylphenol, m-n-hexylphenol, p-n-hexylphenol, p-t-octylphenol, o-cyclohexylphenol, m-cyclohexylphenol, p-cyclohexylphenol, o-phenylphenol, m-phenylphenol, p-phenylphenol, o-n-nonylphenol, m-n-nonylphenol, p-n-nonylphenol, o-cumylphenol, m-cumylphenol, p-cumylphenol, o-naphthylphenol, m-naphthylphenol, p-naphthylphenol, 2,5-di-t-butylphenol, 2,4-di-t-butylphenol, 3,5-di-t-butylphenol, 2,5-dicumylphenol, 3,5-dicumylphenol, p-cresol, p-bromophenol, 2,4,6-tribrcomophenol, amonoalkylphenol having a linear or branched alkyl group having 12 to 35 carbon atoms on average at the ortho-, meta-, or para-position, 9-(4-hydroxyphenyl)-9-(4-methoxyphenyl)fluorene, 9-(4-hydroxy-3-methylphenyl)-9-(4-methoxy-3-methylphenyl)fluorene, and 4-(1-adamantyl)phenol. Among them, p-t-butylphenol, p-cumylphenol, and p-phenylphenol are preferred, and p-t-butylphenol is more preferred.

It should be noted that the molecular weight modifier is preferably used after dissolution in a water-insoluble organic solvent so that its concentration may become preferably 2 to 20% by mass, more preferably 4 to 15% by mass, still more preferably 4 to 12% by mass. Examples of the water-insoluble organic solvent include the same solvents as those described above. Among them, methylene chloride is preferred.

Although an embodiment of the reaction is not particularly limited, preferred is a method involving continuously or intermittently supplying the alkaline compound aqueous solution of the dihydric phenol-based compound, the water-insoluble organic solvent, and the carbonate precursor into the reactor, and as necessary, adding the polymerization catalyst aqueous solution thereto while keeping the temperature of the reaction liquid at 40° C. or less, to thereby perform the reaction.

The weight-average molecular weight (Mw) of the thus obtained polycarbonate oligomer is preferably 500 to 3,000, more preferably 700 to 2,000, still more preferably 800 to 1,500.

The reaction mixture liquid obtained in the step (a-1) is separated into an aqueous phase and a water-insoluble organic solvent phase, and the water-insoluble organic solvent phase containing the polycarbonate oligomer is used in the step (a-2). Meanwhile, there may be the case where the polycarbonate oligomer or the dihydric phenol-based compound is also incorporated into the aqueous phase. Then, it is preferred to include a so-called waste water-treating step of extracting such an organic material from the aqueous phase with a water-insoluble organic solvent, followed by the use of the resultant extract as a part or the whole of the water-insoluble organic solvent to be used in the step (a-2). It is preferred to perform the extraction operation by mixing the aqueous phase with an aqueous phase that is obtained by washing with an acidic aqueous solution in a step (C) to be described below and then separating.

(Step (a-2))

The step (a-2) is a step of continuously or intermittently taking a polymerization reaction liquid, which is obtained by polymerizing the dihydric phenol-based compound, the polycarbonate oligomer obtained in the step (a-1), and a polyorganosiloxane in the presence of a water-insoluble organic solvent, out of a reactor. As necessary, the reaction can also be carried out in the presence of a polymerization catalyst, and it is preferred that the reaction be carried out in such a manner. It should be noted that the alkaline compound aqueous solution of the dihydric phenol-based compound prepared in the dissolution tank is used as the dihydric phenol-based compound. In addition, the polycarbonate oligomer obtained in the step (a-1) is preferably used in a state of being mixed with the water-insoluble organic solvent, in other words, as a polycarbonate oligomer solution in the step (a-2), and a water-insoluble organic solvent phase containing the polycarbonate oligomer obtained in the step (a-1) (hereinafter sometimes referred to as "polycarbonate oligomer solution") is more preferably used as it is.

However, upon production of the polycarbonate copolymer, the optimum alkaline compound concentration differs from that of the alkaline compound aqueous solution of the bisphenol used in the production of the polycarbonate oligomer. This is because a terminal group (such as a chloroformate group) of the polycarbonate oligomer reacts with the alkaline compound (such as sodium hydroxide) to cause a decomposition reaction and hence the consumption of the alkaline compound is large. Accordingly, the alkaline compound aqueous solution of the dihydric phenol-based compound prepared in the dissolution tank cannot be used as it is, and hence the alkaline compound aqueous solution is typically further added in a supply tube immediately in front of the reactor for polymer production. As illustrated in FIG. 1, the alkaline compound aqueous solution and the alkaline compound aqueous solution of the dihydric phenol-based compound prepared in the dissolution tank are mixed (hereinafter sometimes referred to as "prior mixing") before the alkaline compound aqueous solution of the dihydric phenol-based compound and the polycarbonate oligomer (solution) obtained in the step (a-1) are mixed. At this time, the "alkaline compound aqueous solution of the dihydric phenol-based compound" and the "alkaline compound aqueous solution" are preferably mixed in a pipe so that the Reynolds number of a fluid after confluence may be 4,000 or more. When the Reynolds number is 4,000 or more (more preferably 10,000 or more, still more preferably 20,000 to 50,000), the flow in the pipe does not become a laminar flow, and hence the deterioration of the mixability of the "alkaline compound aqueous solution of the dihydric phenol-based compound" and the "alkaline compound aqueous solution" can be suppressed, and the amount of the unreacted PDMS can be reduced. It should be noted that the ratio [L/D] of a distance (L) from the point at which the "alkaline compound aqueous solution of the dihydric phenol-based compound" and the "alkaline compound aqueous solution" meet and join to the pipe through which the polycarbonate oligomer (solution) flows, to the inner diameter (D) of the pipe is preferably set to 16 or more (the ratio is more preferably 20 or more, still more preferably 50 or more, and an upper limit therefor is preferably 500, more preferably 300 in ordinary cases). When the Reynolds number is 4,000 or more and the ratio L/D is set to 16 or more, the mixability of the "alkaline compound aqueous solution of the dihydric phenol-based compound" and the "alkaline compound aqueous solution" can be easily made satisfactory, and the amount of the unreacted PDMS reduces. In addition, when "a static mixer is used for the mixing in the pipe" instead of a state where "the Reynolds number is 4,000 or more and the ratio L/D is set to 16 or more", the mixability of the "alkaline compound aqueous solution of the dihydric phenol-based compound" and the "alkaline compound aqueous solution" can also be easily made satisfactory, and the amount of the unreacted PDMS can also be reduced.

When the prior mixing is performed as described above, the pH of the solution increases to reduce the amount of a monovalent salt of the dihydric phenol-based compound (obtained by turning only one of its two hydroxyl groups into a salt) and to increase the amount of a divalent salt thereof (obtained by turning both of the two hydroxyl groups into salts). It is assumed that the reactivity of the divalent salt is low and hence the reactivity of the PDMS relatively rises, and as a result, the amount of the unreacted PDMS reduces. Further, it is assumed that as a result of the prior mixing, the alkaline compound aqueous solution to be added in the polymer production step is mixed with the polycarbonate oligomer (solution) in a state where its alkaline compound concentration is reduced by dilution with the alkaline compound aqueous solution of the dihydric phenol-based compound, and hence the decomposition reaction of a chloroformate group of the polycarbonate oligomer hardly occurs, and a reaction satisfactorily progresses to reduce the amount of the unreacted PDMS.

Figure 2:
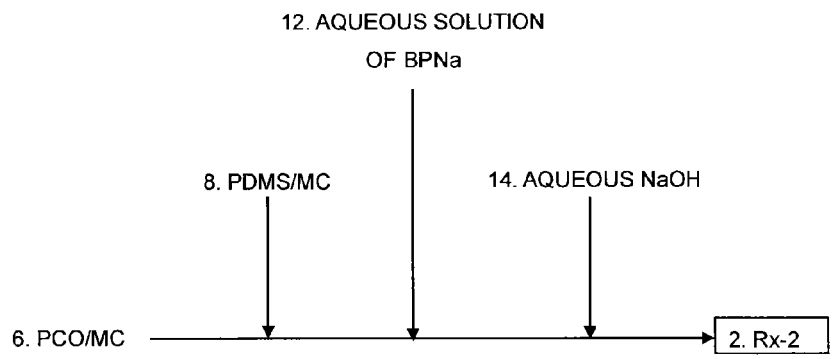
FIG. 2 is a schematic view illustrating an embodiment of a step adopted in Comparative Examples, the step corresponding to the step (a-2) in the present invention.

Meanwhile, the following method has been adopted: as illustrated in FIG. 2, the alkaline compound aqueous solution of the dihydric phenol-based compound and the polycarbonate oligomer (solution) obtained in the step (a-1) are mixed, and then the alkaline compound aqueous solution is supplied to the mixture (hereinafter sometimes referred to as "split supply") and the resultant is subjected to a reaction in a reactor. However, studies made by the inventors of the present invention have found that in the method, the amount of the unreacted PDMS increases to cause quality deterioration problems such as a reduction in transparency of a product and a reduction in impact resistance thereof.

In the step (a-2), the concentration of the dihydric phenol-based compound in an aqueous solution obtained by mixing the alkaline compound aqueous solution and the alkaline compound aqueous solution of the dihydric phenol-based compound prepared in the dissolution tank is preferably 5 to 12% by mass, more preferably 7 to 12% by mass, still more preferably 9 to 12% by mass. In addition, the concentration of the alkaline compound in the aqueous solution obtained by mixing the alkaline compound aqueous solution and the alkaline compound aqueous solution of the dihydric phenol-based compound prepared in the dissolution tank is preferably 5 to 20% by mass, more preferably 5 to 15% by mass, still more preferably 5 to 10% by mass. Of course, by virtue of the mixing with the alkaline compound aqueous solution, the concentration of the dihydric phenol-based compound is lower than that of the alkaline compound aqueous solution of the dihydric phenol-based compound prepared in the dissolution tank, and the concentration of the alkaline compound with respect to the dihydric phenol-based compound increases. Accordingly, such numerical values are selected in the above-mentioned numerical ranges.

It should be noted that in the step (a-2), the ratio of an aqueous phase in the entire mixed liquid to be supplied to the reactor is preferably 35% by volume or less, more preferably 15 to 35% by volume, still more preferably 18 to 30% by volume, particularly preferably 20 to 28% by volume from the viewpoint of reducing the amount of the unreacted PDMS. The case where the ratio is set to 15% by volume or more is industrially preferred because there is no need for the use of a larger amount of the water-insoluble organic solvent than is necessary, while maintaining a reducing effect on the amount of the unreacted PDMS. When the ratio is 35% by volume or less, the continuous phase of a condensation liquid is prevented from changing from the water-insoluble organic solvent phase to the aqueous phase, and hence a condensation reaction rate can be maintained at a high value. It should be noted that when the condensation reaction rate reduces, the unreacted PDMS remains at a reaction step outlet. In addition, when the reaction of a chloroformate group (CF group) in the polycarbonate oligomer is not completed and the polycarbonate oligomer having CF group flows into the washing step, defective separation between the organic phase and the aqueous phase occurs in the washing step to preclude sufficient removal of impurities, and hence excellent transparency is hardly obtained.

It should be noted that in the step (a-2), the polyorganosiloxane and the polycarbonate oligomer are preferably mixed in the absence of a polymerization catalyst and in the absence of an alkaline compound (excluding a tertiary amine and a quaternary ammonium salt). Here, the phrase "in the absence of" refers to a state where the catalyst or the compound is substantially absent.

Compatibility between the polyorganosiloxane and the polycarbonate oligomer is low. Accordingly, when the polymerization catalyst and/or the alkaline compound is supplied without the prior mixing of the polyorganosiloxane and the polycarbonate oligomer, a reaction between the polycarbonate oligomer and the polyorganosiloxane tends to progress "locally". Then, the possibility that a polymer chain having a high polyorganosiloxane concentration is partially produced increases and the transparency reduces in some cases. In addition, the compatibility between the polyorganosiloxane and the polycarbonate oligomer reduces as the average number n of repetitions of the organosiloxane constituent unit increases. For example, a polyorganosiloxane in which n=70 to 120 has much lower reactivity, and hence the amount of the unreacted PDMS at the reaction step outlet increases and the low-temperature impact strength of a PC-POS to be obtained deteriorates. Accordingly, an effect obtained by the present invention easily becomes remarkable when a PC-POS in which n=70 to 120 is produced.

In addition, as the usage of the polymerization catalyst increases, the reaction of the PDMS is accelerated and hence the amount of the unreacted PDMS can be reduced. However, when the usage is excessively large, the production cost increases. Accordingly, the usage of the polymerization catalyst is preferably 0.00002 to 0.02 part by mass, more preferably 0.0001 to 0.01 part by mass, still more preferably 0.0002 to 0.002 part by mass with respect to 1 part by mass of the polycarbonate oligomer.

As an embodiment of the polymerization reaction in the step (a-2), for example, from the viewpoint of reducing the amount of the unreacted polydimethylsiloxane (PDMS) as much as possible, it is preferred to divide the polymerization reaction into a preliminary polymerization step and a main polymerization step as described below.

(Preliminary Polymerization Step)

The preliminary polymerization step is a step of continuously or intermittently supplying a polycarbonate oligomer and a water-insoluble organic solvent, a polyorganosiloxane, a water-insoluble organic solvent, and an alkaline compound aqueous solution, to thereby perform the reaction. As necessary, the reaction can also be carried out in the presence of a polymerization catalyst, and it is preferred that the reaction be carried out in such a manner.

In this step, operation procedures are preferred in which the polycarbonate oligomer and the water-insoluble organic solvent, and the polyorganosiloxane are supplied and mixed; thereafter, the polymerization catalyst is supplied, as necessary; and subsequently, the alkaline compound aqueous solution is supplied and mixed.

(Main Polymerization Step)

The main polymerization step is a step of, after cooling the preliminary polymerization liquid obtained in the preliminary polymerization step to 25° C. or less, continuously or intermittently supplying and mixing the alkaline compound aqueous solution, the mixed liquid of the dihydric phenol-based compound with the alkaline compound aqueous solution prepared in the dissolution tank, and a molecular weight modifier to perform the main polymerization, and continuously or intermittently taking the resultant polymerization reaction liquid out of a reactor. As necessary, the main polymerization can also be carried out in the presence of a polymerization catalyst, and it is preferred that the main polymerization be carried out in such a manner.

In the preliminary polymerization step, it is preferred that each of the polyorganosiloxane and the polycarbonate oligomer to be mixed with the polyorganosiloxane be dissolved in or mixed with the water-insoluble organic solvent. In that case, the concentration of the polyorganosiloxane is preferably 10 to 30% by mass, more preferably 15 to 25% by mass. The solid content concentration of the polycarbonate oligomer solution is set to preferably 300 g/L or less, more preferably 250 g/L or less, still more preferably 220 g/L or less. In this way, the transparency of the polycarbonate-polyorganosiloxane copolymer can be increased. This is because the compatibility between the polyorganosiloxane and the polycarbonate oligomer is low, and hence, when the polyorganosiloxane concentration or the polycarbonate oligomer concentration (solid content concentration) is too high, the polyorganosiloxane tends to exist in a dispersed state in the polycarbonate oligomer. When the polyorganosiloxane concentration is set to 10 to 30% by mass, and the polycarbonate oligomer concentration is set to 300 g/L or less, the polyorganosiloxane can be quickly and sufficiently dissolved in the polycarbonate oligomer solution with ease, and hence the uniformity of the polymerization reaction is enhanced. As a result, a polycarbonate-polyorganosiloxane copolymer having excellent transparency tends to be obtained.

A supply ratio between the supply rate of the polycarbonate oligomer and the supply rate of the polyorganosiloxane [polycarbonate oligomer: polyorganosiloxane] may be appropriately set in consideration of the composition of the PC-POS to be produced.

In the preliminary polymerization step, the polymerization catalyst is preferably used as a solution of a water-insoluble organic solvent from the viewpoint of enhancing the uniformity of the reaction to increase the transparency of the polycarbonate-polyorganosiloxane copolymer to be obtained. Examples of the water-insoluble organic solvent include the same solvents as those described above. Among them, methylene chloride is preferred from the viewpoint of enhancing the dispersibility of the polymerization catalyst. The concentration of the polymerization catalyst in the polymerization catalyst solution is preferably 0.05 to 5% by mass, more preferably 0.1 to 5% by mass.

In the preliminary polymerization step, the alkaline compound is preferably used as an alkaline compound aqueous solution. In addition, in that case, it is preferred to set the concentration of the alkaline compound aqueous solution (alkali concentration) to 2 to 15% by mass. On the occasion of the preliminary polymerization, the alkaline compound is consumed by three reactions including (1) a reaction between the polycarbonate oligomer and the polyorganosiloxane, (2) a reaction between a chloroformate group of the polycarbonate oligomer and a hydroxyl group, and (3) a decomposition reaction of a chloroformate group of the polycarbonate oligomer. When the alkali concentration of the alkaline compound aqueous solution to be supplied is 15% by mass or less, the progress of the reaction (3) can be suppressed from the standpoint of a reaction rate, and an increase in the amount of the unreacted polyorganosiloxane can be suppressed. The alkali concentration of the alkaline compound aqueous solution to be supplied at the time of preliminary polymerization is preferably 3 to 15% by mass, more preferably 3 to 12% by mass from the viewpoints of reaction efficiency of the polyorganosiloxane and transparency of the polycarbonate-polyorganosiloxane copolymer.

It should be noted that the preliminary polymerization is carried out by an interfacial polymerization reaction. In general, in the case of an interfacial polymerization reaction, there are included two ways of the case where the aqueous phase is a continuous phase and the case where the water-insoluble organic solvent phase is a continuous phase, and in order to obtain a PC-POS having excellent transparency, it is preferred that the water-insoluble organic solvent phase be a continuous phase. For the purpose of increasing the uniformity of a reaction between the polyorganosiloxane and the polycarbonate oligomer in order to get the transparency, the water-insoluble organic solvent phase is stirred as a continuous phase and then the uniformity between both of the polyorganosiloxane and the polycarbonate oligomer can be increased, because both of the polyorganosiloxane and the polycarbonate oligomer exist in the water-insoluble organic solvent phase.

In the main polymerization step, the preliminary polymerization liquid obtained in the preliminary polymerization step is preferably once cooled to 25° C. or less (preferably about 15 to 20° C.). Thereafter, the alkaline compound aqueous solution of the dihydric phenol-based compound and the molecular weight modifier (chain-end terminator), and as necessary, a polymerization catalyst are continuously or intermittently supplied and mixed to perform the main polymerization.

With respect to the dihydric phenol-based compound, the alkaline compound, the molecular weight modifier (chain-end terminator), and the polymerization catalyst, the same materials as those described above are exemplified, and preferred materials are also the same. It should be noted that the molecular weight modifier is preferably used after dissolved in a water-insoluble organic solvent so that its concentration may become preferably 2 to 20% by mass, more preferably 4 to 15% by mass, still more preferably 4 to 12% by mass. Examples of the water-insoluble organic solvent include the same solvents as those described above. Among them, methylene chloride is preferred.

The thus obtained polymerization reaction liquid is continuously or intermittently taken out of the reactor, and in general, is preferably transferred into the following step (B).

(Step (B))

The step (B) is a step of separating the polymerization reaction liquid taken out in the step (A) (namely, the polymerization reaction liquid taken out after the step (a-2)) into an aqueous phase and a water-insoluble organic solvent phase. The method for the separation is not particularly limited, and standing separation may be adopted. From the viewpoint of making the separated state between the aqueous phase and the water-insoluble organic solvent phase satisfactory, it is preferred to perform centrifugation. Although the centrifugation condition is not particularly limited, in general, a rotational speed is preferably about 1,000 to 3,000 rpm.

In many cases, the water-insoluble organic solvent phase obtained after the separation contains a trace amount of the dihydric phenol-based compound, and therefore, it is preferred to wash the water-insoluble organic solvent phase with an alkali aqueous solution (hereinafter sometimes referred to as alkali washing). Examples of the alkaline compound to be used for the alkali aqueous solution include the same materials as those used in the step (A), and it is preferred to use the same material. After the washing with the alkali aqueous solution, the resultant is separated into an aqueous phase and a water-insoluble organic solvent phase. On this occasion, the method for the separation is not particularly limited, and standing separation may be adopted. From the viewpoint of making the separated state between the aqueous phase and the water-insoluble organic solvent phase satisfactory, it is preferred to perform centrifugation at the above-mentioned rotational speed. Although the amount of the alkali aqueous solution to be used for the washing is not particularly limited, the amount is preferably about 5 to 40% by volume, more preferably 5 to 30% by volume, still more preferably 10 to 20% by volume in the whole liquid, from the viewpoints of a washing effect and a reduction in the generation amount of waste water. When the amount of the alkali aqueous solution is 40% by volume or less, the continuous phase does not change from the organic phase to the aqueous phase, and the extraction efficiency from the organic phase can be kept high.

The aqueous phase obtained in the step (B) is preferably reused in the step (A), especially the step (a-1) from the viewpoint of a production cost because the aqueous phase contains the dihydric phenol-based compound or the alkaline compound.

After the step (B), it is preferred to proceed to the following step (C).

(Step (C))

The step (C) is a step of after washing the water-insoluble organic solvent phase separated in the step (B) with an acidic aqueous solution (hereinafter sometimes referred to as "acid washing"), separating the resultant into an aqueous phase and a water-insoluble organic solvent phase. The polymerization catalyst or a trace amount of the alkaline compound, which may be contained in the water-insoluble organic solvent phase separated in the step (B), can be removed by this acid washing. It should be noted that the method for the separation is not particularly limited, and standing separation may be adopted. Examples of the acid which is used for preparation of the acidic aqueous solution include hydrochloric acid and phosphoric acid, with hydrochloric acid being preferred; however, it should be construed that the acid is not particularly limited thereto.

Because the acid or the inorganic material used for washing tends to be contained in the water-insoluble organic solvent phase obtained by the above-mentioned separation, it is preferred to conduct washing with water at least onetime (hereinafter sometimes referred to as "water washing"). Here, the degree of cleanliness of the water-insoluble organic solvent phase can be evaluated according to an electric conductivity of the aqueous phase after washing. The intended electric conductivity is preferably 1 mS/m or less, more preferably 0.5 mS/m or less. After washing with water, the resultant is separated into an aqueous phase and a water-insoluble organic solvent phase. On this occasion, the method for the separation is not particularly limited, and standing separation may be adopted.

The PC-POS and under some circumstances, the polymerization catalyst and the like are contained in the aqueous phase separated in the step (C) (also including the aqueous phase after water washing), and hence these are extracted with a water-insoluble organic solvent, and a part or the whole of the extract is preferably reused for the step (A), particularly the step (a-2) properly after a devolatilization process for the removal of carbon dioxide or a distillation purification process. As for the devolatilization step, a method described in JP 2005-60599 A can be adopted.

The PC-POS can be obtained by concentrating the water-insoluble organic solvent phase obtained through the step (C) [concentration step], pulverizing [pulverization step], and drying [drying step], or further granulating [granulation step]. It is preferred that the water-insoluble organic solvent removed in the concentration step be reused for the step (A), or reused as a solvent for extracting organic materials such as the PC-POS from the aqueous phase separated in the washing step. In the drying step, in general, it is preferred to conduct drying at about 80 to 160° C. under reduced pressure.

It should be noted that it is also preferred that the water-insoluble organic solvent phase obtained in the concentration step be reused for the step (A).

In addition, as described in the foregoing, the method preferably includes a waste water-treating step of extracting at least one (preferably both) of the aqueous phase separated from the reaction mixed liquid obtained in the step (a-1) and the aqueous phase obtained by separation after the washing with the acidic aqueous solution in the step (C) with the water-insoluble organic solvent, followed by the utilization of the resultant extract as the part or the entirety of the water-insoluble organic solvent to be used in the step (a-2).

In addition to the foregoing, the production method of the present invention preferably includes, for example, a distillation purifying step for the water-insoluble organic solvent or a devolatilizing step for the removal of carbon dioxide in the water-insoluble organic solvent.

It should be noted that the reactor to be used in the production method of the present invention is not particularly limited as long as the reactor can stir a fluid, and any one of the tube-type, tower-type, and tank-type reactors is permitted. Among them, the tube-type reactor is preferred from the viewpoint that an entirely small facility can be easily produced. A stirring apparatus such as a pipeline homomixer can be preferably used as the tube-type reactor.

In addition, when the solutions are mixed in pipes by joining the pipes with each other, the solutions are preferably mixed well with a static mixer or the like.

The PC-POS to be obtained by the production method of the present invention has a total light transmittance of 60% or more, preferably 70% or more, and the total light transmittance is approximately 70 to 92%. A total light transmittance of 88% or more is more excellent and a total light transmittance of 89% or more is still more excellent.

In addition, the PC-POS has a haze of 40% or less and the haze is about 0.1 to 40%. A haze of 20% or less is more excellent, a haze of 3% or less is still more excellent, and a haze of 1% or less is particularly excellent.

Further, the PC-POS has an impact strength of 60 kJ/m$^2$ or more and the impact strength is about 60 to 80 kJ/m$^2$. An impact strength of 70 kJ/m$^2$ or more is more excellent.

It should be noted that the values for the total light transmittance, the haze, and the impact strength are each a value measured in accordance with a measurement method described in Examples.

EXAMPLES

Examples of the present invention are further described. It should be noted that the present invention is by no means limited by Examples. Here, in each example, the amount of a polydimethylsiloxane (PDMS) residue, a viscosity number, a viscosity-average molecular weight (Mv), the amount of an unreacted PDMS, the reaction ratio of the PDMS, a total light transmittance, a haze, and an impact strength were determined by the following methods.

(1. Amount of Polydimethylsiloxane (PDMS) Residue)

The amount was determined by peak of protons of methyl groups in a PDMS by NMR measurement.

(2. Method Calculating Amount of Unreacted PDMS)

(i) To a solution of 6 g of a polycarbonate-polydimethylsiloxane copolymer obtained in each example in 50 ml of methylene chloride, 50 ml of acetone and 150 ml of n-hexane were added and mixed, and then the mixture was left to stand still for 30 minutes.

(ii) Suction filtration with filter paper (No. 5A) was conducted to obtain a filtrate, the recovered filtrate was concentrated to dryness, and the weight of the resultant dry solid was measured. The resultant dry solid was dissolved in deuterated chloroform and subjected to $^1$H-NMR measurement. A proportion z (%) of an unreacted PDMS was calculated from an integrated value x of a proton of a hydroxyl group at the ortho-position of an unreacted phenol-modified polydimethylsiloxane (δ 6.7 ppm) and an integrated value y of a proton assigned to a methylene chain (δ 0.6 ppm) according the following expression.

$$z = 2 \times x/y \times 100$$

(iii) Meanwhile, a standard sample in which a phenol-modified polydimethylsiloxane was added at 150 to 2,000 ppm to a polycarbonate-polydimethylsiloxane copolymer was separately prepared and subjected to the same operations as those described above, thereby determining a relational expression between z and the amount of an unreacted PDMS (ppm; =the addition amount of a phenol-modified polydimethylsiloxane).

The amount of an unreacted PDMS (ppm) was calculated from z determined in (ii) and the relational expression determined in (iii).

It should be noted that the terms "ppm" each mean "ppm by mass."

(3. Viscosity Number)

A viscosity number was measured in conformity with ISO 1628-4 (1999).

(4. Method of Measuring Viscosity-Average Molecular Weight (Mv))

The limiting viscosity [η] of a methylene chloride solution at 20° C. was measured with an Ubbelohde-type viscosity tube, and a viscosity-average molecular weight was calculated from the following relational expression (Schnell's equation).

$$[\eta]=1.23\times10^{-5}\times Mv^{0.83}$$

(5. Methods of measuring Total Light Transmittance and Haze)

100 Parts by mass of a flake of a polycarbonate-polydimethylsiloxane copolymer obtained in each example and about 0.1 part by mass of "IRGAFOS 168" (trade name, manufactured by BASF) as an antioxidant were mixed, and the mixture was granulated with a vented single-screw extruder having a diameter of 40 mm at a resin temperature of 280° C. to provide a pellet.

The resultant pellet was dried at 120° C. for 8 hours, and was then subjected to injection molding with an injection molding machine at a molding temperature of 280° C. and a die temperature of 80° C. to provide a three-stage plate having thicknesses of 1 mm, 2 mm, and 3 mm. The total light transmittance of the plate was measured in accordance with ISO 13468 and the haze thereof was measured in accordance with ISO 14782. Each measurement was performed for the portion having a thickness of 3 mm three times and the average of the three measured values was determined.

(6. Method of Measuring Impact Strength)

The pellet obtained in accordance with the method described in the section 5 was dried at 120° C. for 8 hours, and was then subjected to injection molding with an injection molding machine at a molding temperature of 280° C. and a die temperature of 80° C. to provide a test piece. The notched Izod impact strength of the test piece at 23° C. was measured in conformity with ASTM-D256 and the measured value was used as an indicator of its impact resistance.

Synthesis Example 1

Production of Polycarbonate Oligomer Solution (Step (A)-Step (a-1))

In a dissolution tank for bisphenol A, to 5.6% by mass aqueous sodium hydroxide, sodium dithionite was added in an amount of 2,000 ppm by mass relative to bisphenol A to be dissolved later, and bisphenol A was then dissolved therein so that the concentration of bisphenol A became 13.5% by mass, to thereby prepare a solution of bisphenol A in aqueous sodium hydroxide.

The solution of bisphenol A in aqueous sodium hydroxide prepared in the dissolution tank, methylene chloride, and phosgene were continuously passed through a tubular reactor having an inner diameter of 6 mm and a tube length of 30 m at flow rates of 40 L/hr, 15 L/hr, and 4.0 kg/hr, respectively. The tubular reactor had a jacket portion, and cooling water was passed through the jacket to keep the reaction liquid at a temperature of 40° C. or less.

The reaction liquid that had exited the tubular reactor was continuously introduced into a baffled tank-type reactor having an internal volume of 40 L and provided with a sweptback blade, and then, 2.8 L/hr of the solution of bisphenol A in aqueous sodium hydroxide, 0.07 L/hr of 25% by mass aqueous sodium hydroxide, 17 L/hr of water, and 0.64 L/hr of a 1% by mass triethylamine aqueous solution were further added to the reactor to perform a reaction. The reaction liquid overflown from the tank-type reactor was continuously taken out and left to stand still to separate and remove an aqueous phase, and a methylene chloride phase was then collected.

The concentration of the thus obtained polycarbonate oligomer solution (methylene chloride solution) was 324 g/L, and the concentration of a chloroformate group thereof was 0.74 mol/L. In addition, the polycarbonate oligomer had a weight-average molecular weight (Mw) of 1,190.

It should be noted that the weight-average molecular weight (Mw) was measured as a molecular weight (weight-average molecular weight: Mw) in terms of standard polystyrene by GPC (column: TOSOH TSK-GEL MULTIPORE HXL-M (two)+Shodex KF801 (one), temperature: 40° C., flow rate: 1.0 ml/min, detector: RI) with tetrahydrofuran (THF) as a developing solvent.

Example 1

Figure 3:
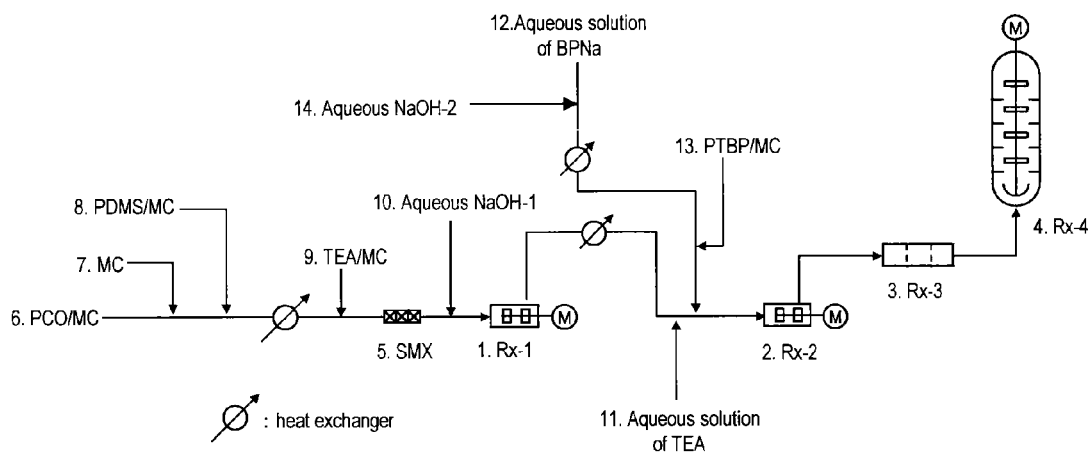
FIG. 3 is a schematic view of an apparatus for producing a polycarbonate-polyorganosiloxane copolymer used in Examples.

A polycarbonate-polydimethylsiloxane copolymer was continuously produced with a production apparatus illustrated in FIG. 3. A method for the production is specifically as described below.

(Step (A)-(a-2)—Preliminary Mixing)

The polycarbonate oligomer (PCO) solution produced in Synthesis Example 1 and methylene chloride (MC) were mixed at flow rates shown in Table 1 in a pipe (polycarbonate oligomer concentration: 221 g/L). Then, a 20% by mass solution of an allylphenol terminal-modified polydimethylsiloxane in which the number (n) of repetitions of a dimethylsiloxane unit was 90 in methylene chloride was added to the mixture, and the contents were mixed in the pipe. After that, the contents were mixed well with a static mixer and then the mixed liquid was cooled to 19 to 22° C. with a heat exchanger.

The cooled mixed liquid was mixed with a 1% by mass solution of triethylamine (TEA) in methylene chloride in the pipe and then the contents were sufficiently mixed with a static mixer. After that, 8.0% by mass aqueous sodium hydroxide (aqueous NaOH-1) was added to the mixture immediately in front of a reactor (Rx-1), and a reaction (preliminary polymerization) between the polycarbonate oligomer and the allylphenol terminal-modified PDMS was performed in the reactor (Rx-1) while a methylene chloride phase was used as a continuous phase. It should be noted that the reactor (Rx-1) was a mixer provided with a turbine blade "Pipeline Homomixer" [manufactured by Tokushu Kika Kogyo Co., Ltd.] and was operated at a number of rotations of 4,400 rpm.

(Step (A)-(a-2)—Main Polymerization)

The preliminary polymerization liquid that had exited the reactor (Rx-1) was cooled to 17 to 20° C. with a heat exchanger. After that, first, a 1% by mass aqueous solution of triethylamine (aqueous solution of TEA) was added to the liquid immediately in front of a reactor (Rx-2). Next, the solution of bisphenol A (BPA) in the aqueous sodium hydroxide (aqueous solution of BPNa) [prepared in the dissolution tank for bisphenol A in Synthesis Example 1] and 15% by mass aqueous sodium hydroxide (aqueous NaOH-2) were met and joined thereto and mixed well with a static mixer (referred to as "prior mixing" in Table 1). After that, an 8% by mass solution of p-t-butylphenol (PTBP) in methylene chloride was further added to the mixture, and the contents were mixed in a pipe. The resultant mixture was added to the preliminary polymerization liquid, and the whole was subjected to a polymerization reaction (main polymerization) in the reactor (Rx-2). An aqueous phase ratio at the inlet of the reactor (Rx-2) was 27.6% by volume. It should be noted that the reactor (Rx-2) was a mixer provided with a turbine blade "Pipeline Homomixer" [manufactured by Tokushu Kika Kogyo Co., Ltd.] and was operated at a number of revolutions of 4,400 rpm.

The polymerization reaction liquid that had exited the reactor (Rx-2) was sequentially introduced into a reactor (Rx-3) and a reactor (Rx-4), and the polymerization reaction was completed while its temperature was controlled to 38° C. or less. The reactor (Rx-3) is a reactor having an orifice plate and a cooling jacket, and the reactor (Rx-4) is a tower five-stage reactor having a cooling jacket.

(Step (B) and Step (C))

35 Liters of the polymerization reaction liquid collected from the reactor (Rx-4) and 10 L of methylene chloride for dilution were charged into a 50-L tank-type washing tank provided with a baffle board and a paddle-type stirring blade, and were stirred at 240 rpm for 10 minutes. After that, the mixture was left to stand still for 1 hour to be separated into an organic phase containing the polycarbonate-polydimethylsiloxane copolymer, and an aqueous phase containing excessive amounts of bisphenol A and sodium hydroxide, followed by the isolation of the organic phase.

The solution of the polycarbonate-polydimethylsiloxane copolymer in methylene chloride thus obtained was sequentially washed with 0.03 mol/L aqueous sodium hydroxide and 0.2 mol/L hydrochloric acid in amounts of 15% by volume each with respect to the solution. Next, the solution was repeatedly washed with pure water so that an electric conductivity in an aqueous phase after the washing became 0.1 mS/m or less.

(Concentrating Step and Drying Step)

The solution of the polycarbonate-polydimethylsiloxane copolymer in methylene chloride thus obtained was concentrated. After that, the concentrate was pulverized and dried under reduced pressure at 120° C.

Table 2 shows the respective physical properties of the polycarbonate-polydimethylsiloxane copolymer obtained as described above.

Example 2

Operations were performed in the same manner as in Example 1 except that the flow rates of the respective raw materials and reagents were changed as shown in Table 1. Table 2 shows the respective physical properties of the resultant polycarbonate-polydimethylsiloxane copolymer.

Example 3

Reaction in Tank-Type Reactor

A mixed liquid obtained by mixing the polycarbonate oligomer (PCO) solution produced in Synthesis Example 1 and methylene chloride (MC) in a pipe (polycarbonate oligomer concentration: 223 g/L), a 20% by mass solution of an allylphenol terminal-modified polydimethylsiloxane in which the number n of repetitions of a dimethylsiloxane unit was 90 in methylene chloride, a 1% by mass solution of triethylamine (TEA) in methylene chloride, and a 6.4% by mass aqueous sodium hydroxide (aqueous NaOH-1) were introduced into a tank-type reactor (Rx-5) provided with a baffle board and a paddle blade, and having an internal volume of 50 L, and a reaction (preliminary polymerization) between the polycarbonate oligomer and the allylphenol terminal-modified PDMS was performed by stirring the resultant solution at 300 rpm.

The preliminary polymerization liquid was taken out of the reactor (Rx-5) and cooled to 17 to 20° C. with a heat exchanger. The preliminary polymerization liquid after the cooling, a 1% by mass aqueous solution of triethylamine (TEA), and a mixture, which had been obtained by joining the solution of bisphenol A in the aqueous sodium hydroxide (aqueous solution of BPNa) [prepared in the dissolution tank for bisphenol A in Synthesis Example 1] to the 15% by mass aqueous sodium hydroxide (aqueous NaOH-2), mixing the solutions well with a static mixer, then further adding an 8% by mass solution of p-t-butylphenol (PTBP) in methylene chloride to the mixture, and mixing the contents in a pipe, were introduced into a tank-type reactor (Rx-6) having an internal volume of 50 L, and a polymerization reaction (main polymerization) was performed by stirring the resultant solution at 300 rpm while using a methylene chloride phase as a continuous phase. The polymerization reaction was completed while a temperature in the tank-type reactor was controlled to 38° C. or less.

Operations in the separating step and the steps thereafter were performed in the same manner as in Example 1. Table 2 shows the respective physical properties of the resultant polycarbonate-polydimethylsiloxane copolymer.

Example 4

Operations were performed in the same manner as in Example 1 except that the number n of repetitions of the dimethylsiloxane unit of the allylphenol terminal-modified polydimethylsiloxane (PDMS) was changed to 40.

Table 2 shows the respective physical properties of the resultant polycarbonate-polydimethylsiloxane copolymer.

Comparative Example 1

In Example 1, the preliminary polymerization liquid that had exited the reactor (Rx-1) for the preliminary polymerization reaction was cooled to 17 to 20° C. After that, a 1% by mass aqueous solution of triethylamine (TEA) was added to the liquid. After that, a mixture, which had been obtained by adding an 8% by mass solution of p-t-butylphenol (PTBP) in methylene chloride to the solution of bisphenol A in the aqueous sodium hydroxide (aqueous solution of BPNa) [prepared in the dissolution tank for bisphenol A in Synthesis Example 1] and mixing the contents in a pipe, was added to the preliminary polymerization liquid. The 15% by mass aqueous sodium hydroxide (aqueous NaOH-2) was added to the mixture immediately in front of the reactor (Rx-2) (referred to as "split supply" in Table 1), and the whole was subjected to a polymerization reaction (main polymerization) in the reactor (Rx-2). Operations were performed in the same manner as in Example 1 except the foregoing.

Table 2 shows the respective physical properties of the resultant polycarbonate-polydimethylsiloxane copolymer.

Comparative Example 2

In Example 2, the preliminary polymerization liquid that had exited the reactor (Rx-1) for the preliminary polymerization reaction was cooled to 17 to 20° C. After that, a 1% by mass aqueous solution of triethylamine (TEA) was added to the liquid. After that, a mixture, which had been obtained by adding an 8% by mass solution of p-t-butylphenol (PTBP) in methylene chloride to the solution of bisphenol A in the aqueous sodium hydroxide (aqueous solution of BPNa) [prepared in the dissolution tank for bisphenol A in Synthesis Example 1] and mixing the contents in a pipe, was added to the preliminary polymerization liquid. The 15% by mass aqueous sodium hydroxide (aqueous NaOH-2) was added to the mixture immediately in front of the reactor (Rx-2), and the whole was subjected to a polymerization reaction (main polymerization) in the reactor (Rx-2). Operations were performed in the same manner as in Example 1 except the foregoing.

Table 2 shows the respective physical properties of the resultant polycarbonate-polydimethylsiloxane copolymer.

Comparative Example 3

Operations were performed in the same manner as in Comparative Example 2 except that the flow rates of the respective raw materials and reagents were changed as shown in Table 1.

Table 2 shows the respective physical properties of the resultant polycarbonate-polydimethylsiloxane copolymer.

Comparative Example 4

In Example 3, the preliminary polymerization liquid was taken out of the reactor (Rx-5) and cooled to 17 to 20° C. with a heat exchanger. After that, a 1% by mass aqueous solution of triethylamine (TEA) was added to the liquid. After that, a mixture, which had been obtained by adding an 8% by mass solution of p-t-butylphenol (PTBP) in methylene chloride to the solution of bisphenol A in the aqueous sodium hydroxide (aqueous solution of BPNa) [prepared in the dissolution tank for bisphenol A in Synthesis Example 1] and mixing the contents in a pipe, was added to the preliminary polymerization liquid. The 15% by mass aqueous sodium hydroxide (aqueous NaOH-2) was added to the mixture immediately in front of the reactor (Rx-2), and the whole was subjected to a polymerization reaction (main polymerization) in the reactor (Rx-6). Operations were performed in the same manner as in Example 3 except the foregoing.

Table 2 shows the respective physical properties of the resultant polycarbonate-polydimethylsiloxane copolymer.

Comparative Example 5

In Example 4, the preliminary polymerization liquid that had exited the reactor (Rx-1) for the preliminary polymerization reaction was cooled to 17 to 20° C. After that, a 1% by mass aqueous solution of triethylamine (TEA) was added to the liquid. After that, a mixture, which had been obtained by adding an 8% by mass solution of p-t-butylphenol (PTBP) in MC to the solution of bisphenol A in the aqueous sodium hydroxide (aqueous solution of BPNa) [prepared in the dissolution tank for bisphenol A in Synthesis Example 1] and mixing the contents in a pipe, was added to the preliminary polymerization liquid. The 15% by mass aqueous sodium hydroxide (aqueous NaOH-2) was added to the mixture immediately in front of the reactor (Rx-2), and the whole was subjected to a polymerization reaction (main polymerization) in the reactor (Rx-2). Operations were performed in the same manner as in Example 4 except the foregoing.

Table 2 shows the respective physical properties of the resultant polycarbonate-polydimethylsiloxane copolymer.

TABLE 1

| | | Unit | Example 1 | Example 2 | Example 3 | Example 4 | Comparative Example 1 |
|---|---|---|---|---|---|---|---|
| Average number of repetitions of PDMS unit (n) | | — | 90 | 90 | 90 | 40 | 90 |
| Reaction apparatus | | — | Tubular tower type | Tubular tower type | Tank type | Tubular tower type | Tubular tower type |
| Flow rate | PCO*[1] | kg/hr | 26 | 26 | 26 | 26 | 26 |
| | MC | kg/hr | 12.3 | 12.5 | 12.3 | 12.2 | 12.3 |
| | 20% by mass PDMS/MC | kg/hr | 2.6 | 2.6 | 2.6 | 2.8 | 2.6 |
| | 1% by mass TEA/MC | kg/hr | 0.50 | 0.35 | 0.50 | 0.50 | 0.50 |
| | Aqueous NaOH-1 | kg/hr | 1.40 | 1.40 | 1.40 | 1.40 | 1.40 |
| | 1% by mass TEA/water | kg/hr | 0.17 | 0.17 | 0.17 | 0.17 | 0.17 |
| | 8% by mass PTBP/MC | kg/hr | 1.3 | 1.3 | 1.3 | 1.3 | 1.3 |
| | Aqueous solution of BPNa | kg/hr | 10.2 | 10.2 | 10.2 | 10.2 | 10.2 |
| | Aqueous NaOH-2 | kg/hr | 1.5 | 1.5 | 1.5 | 1.5 | 1.5 |
| | | | Prior mixing | Prior mixing | Prior mixing | Prior mixing | Split supply |
| Concentration of BPA in solution immediately before meeting with PCO | | % by mass | 11.8 | 11.8 | 11.8 | 11.8 | 13.5 |
| NaOH concentration | | % by mass | 7.1 | 7.1 | 7.1 | 7.1 | 15.0 |
| Aqueous phase ratio at inlet of Rx-2 | | % by volume | 27.6 | 27.6 | 27.6 | 27.5 | 27.6 |
| Continuous phase | | | MC phase | MC phase | MC phase | MC phase | MC phase |

| | | | Comparative Example 2 | Comparative Example 3 | Comparative Example 4 | Comparative Example 5 |
|---|---|---|---|---|---|---|
| Average number of repetitions of PDMS unit (n) | | | 90 | 90 | 90 | 40 |
| Reaction apparatus | | | Tubular tower type | Tubular tower type | Tank type | Tubular tower type |
| Flow rate | PCO*[1] | | 26 | 26 | 26 | 26 |
| | MC | | 12.5 | 12.1 | 12.3 | 12.3 |
| | 20% by mass PDMS/MC | | 2.6 | 2.6 | 2.6 | 2.6 |
| | 1% by mass TEA/MC | | 0.35 | 0.78 | 0.50 | 0.50 |
| | Aqueous NaOH-1 | | 1.40 | 1.40 | 1.40 | 1.40 |
| | 1% by mass TEA/water | | 0.17 | 0.17 | 0.17 | 0.17 |
| | 8% by mass PTBP/MC | | 1.3 | 1.3 | 1.3 | 1.3 |

TABLE 1-continued

|  | | | | |
|---|---|---|---|---|
| Aqueous solution of BPNa | 10.2 | 10.2 | 10.2 | 10.2 |
| Aqueous NaOH-2 | 1.5 | 1.5 | 1.5 | 1.5 |
|  | Split supply | Split supply | Split supply | Split supply |
| Concentration of BPA in solution immediately before meeting with PCO | 13.5 | 13.5 | 13.5 | 13.5 |
| NaOH concentration | 15.0 | 15.0 | 15.0 | 15.0 |
| Aqueous phase ratio at inlet of Rx-2 | 27.6 | 27.6 | 27.6 | 27.6 |
| Continuous phase | MC phase | MC phase | MC phase | MC phase |

*[1]Polycarbonate oligomer solution obtained in Synthesis Example 1 (solvent: methylene chloride)
Remark: Abbreviations are as described in the description.

TABLE 2

|  |  | Unit | Example 1 | Example 2 | Example 3 | Example 4 | Comparative Example 1 |
|---|---|---|---|---|---|---|---|
| Result of measurement | Amount of PDMS residue | % by mass | 6.1 | 6.0 | 6.1 | 6.3 | 6.0 |
|  | Amount of unreacted PDMS | ppm by mass | Less than 150 | Less than 150 | Less than 150 | Less than 150 | 1,100 |
|  | Viscosity number | — | 47.1 | 47.2 | 47.4 | 47.7 | 47.0 |
|  | Viscosity-average molecular weight (Mv) | — | 17,500 | 17,600 | 17,700 | 17,800 | 17,500 |
|  | Total light transmittance | % | 71.3 | 71.5 | 71.3 | 89.9 | 56.4 |
|  | Haze | % | 9.4 | 9.8 | 9.5 | 0.4 | 92 |
|  | Izod impact strength (23° C.) | kJ/m$^2$ | 76 | 76 | 76 | 77 | 74 |

|  |  | Comparative Example 2 | Comparative Example 3 | Comparative Example 4 | Comparative Example 5 |
|---|---|---|---|---|---|
| Result of measurement | Amount of PDMS residue | 6.0 | 6.1 | 6.1 | 6.3 |
|  | Amount of unreacted PDMS | 2,300 | 1,000 | 600 | 260 |
|  | Viscosity number | 47.2 | 47.0 | 47.0 | 47.6 |
|  | Viscosity-average molecular weight (Mv) | 17,600 | 17,500 | 17,500 | 17,500 |
|  | Total light transmittance | 47.2 | 56.4 | 60.2 | 87.5 |
|  | Haze | 93 | 92 | 84 | 1.1 |
|  | Izod impact strength (23° C.) | 54 | 74 | 74 | 77 |

Table 2 shows that according to the production method of the present invention, there is obtained a polycarbonate-polydimethylsiloxane copolymer having a high total light transmittance and a small haze, and excellent in impact resistance as compared to those in the case where the aqueous NaOH-2 was supplied immediately in front of the reactor (Rx-2) without being mixed with the aqueous solution of BPNa in advance like each of Comparative Examples 1 to 5.

Reference Example 1

Production of BPA-PC

Only a mixed liquid obtained by mixing the polycarbonate oligomer (PCO) solution produced in Synthesis Example 1 and methylene chloride (MC) at the same flow rates as those of Example 3 in a pipe (polycarbonate oligomer concentration: 223 g/L) was introduced into the tank-type reactor (Rx-5) provided with a baffle board and a paddle blade, and having an internal volume of 50 L, and the solution was stirred at 300 rpm.

The following two cases were attempted: the case where the steps after the foregoing were performed in the same manner as in Example 3 and the case where the steps after the foregoing were performed in the same manner as in Comparative Example 4. As a result, each polycarbonate-based resin (BPA-PC) had a total light transmittance of about 90% and a haze of about 0.5%, and in the production of a BPA-PC free of any PDMS residue, there was substantially no influence by a method of supplying the aqueous NaOH-2.

INDUSTRIAL APPLICABILITY

The polycarbonate-polydimethylsiloxane copolymer obtained by the present invention is expected to find utilization in various fields such as the field of electrical and electronic equipment and the field of an automobile. In particular, the polycarbonate-polydimethylsiloxane copolymer can be utilized as, for example, a material for the casing of a mobile phone, a mobile personal computer, a digital camera, a video camera, an electric power tool, or the like, or a material for other articles for daily use.

REFERENCE SIGNS LIST 1 to 4 reactor
5 mixer
6 solution of polycarbonate oligomer in methylene chloride
7 methylene chloride
8 solution of allylphenol terminal-modified polydimethylsiloxane in methylene chloride
9 solution of triethylamine in methylene chloride 10 aqueous sodium hydroxide
11 aqueous solution of triethylamine
12 solution of bisphenol A in aqueous sodium hydroxide
13 solution of p-t-butylphenol in methylene chloride
14 aqueous sodium hydroxide

The invention claimed is:

1. A method of continuously producing a polycarbonate-polyorganosiloxane copolymer by polymerizing a dihydric phenol-based compound, a carbonate precursor, and a polyorganosiloxane in a presence of a water-insoluble organic solvent and an alkaline compound aqueous solution comprising said dihydric phenol-based compound, wherein said method comprises:
(i) dissolving, in a dissolution tank, said dihydric phenol-based compound in the alkaline compound aqueous solution,
and said method further comprises step (a-1) and step (a-2)
wherein step (a-1) comprises
mixing the solution prepared in (i) and said carbonate precursor to provide a mixed solution,
preparing a polycarbonate oligomer by reacting the mixed solution in the presence of the water-insoluble organic solvent,
wherein step (a-2) comprises
preparing a preliminary polymerization product by reacting said polycarbonate oligomer with a polyorganosiloxane,
mixing the alkaline compound aqueous solution and the solution prepared in (i) to provide a diluted alkaline compound aqueous solution comprising the dihydric phenol-based compound, and
forming a polycarbonate-polyorganosiloxane copolymer by polymerizing the preliminary polymerized product and the diluted alkaline compound aqueous solution comprising the dihydric phenol-based compound in the presence of a water-insoluble organic solvent, and continuously or intermittently removing a polymerization reaction liquid from the reactor.

2. The method according to claim 1, wherein in the dissolution tank, an alkaline compound aqueous solution of the dihydric phenol-based compound having a concentration of the dihydric phenol-based compound of 8 to 20% by mass and a concentration of an alkaline compound of 3 to 10% by mass is prepared.

3. The method according to claim 1, wherein in the diluted alkaline compound aqueous solution, a concentration of the dihydric phenol-based compound is 5 to 12% by mass and a concentration of an alkaline compound is 5 to 20% by mass.

4. The method according to claim 1, wherein in said forming a polycarbonate-polyorganosiloxane copolymer, a water content, is 35% by volume or less.

5. The method according to claim 1, wherein in said forming a polycarbonate-polyorganosiloxane copolymer the polymerizing is performed in a mixer provided with a turbine blade.

6. The method according to claim 1, wherein the dihydric phenol-based compound is a compound of formula (1) and the polyorganosiloxane is a compound of formula (2):

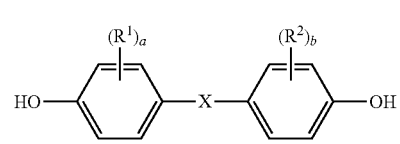

wherein R' and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —$SO_2$—, —O—, or —CO—, and a and b each independently represent an integer of 0 to 4;

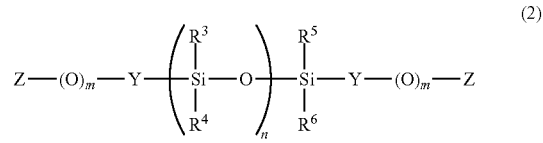

wherein $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, Y represents a single bond, or an organic residue including an aliphatic or aromatic moiety, n represents an average number of repetitions, Z represents a halogen atom, —$R^7$OH, —$R^7$—Z'—$R^8$—OH, —$R^7$COOH, —$R^7NH_2$, —COOH, or —SH, the $R^7$ represents a substituted or unsubstituted alkylene group, a substituted or unsubstituted cycloalkylene group, or a substituted or unsubstituted arylene group, the $R^8$ represents an arylene group having 6 to 12 ring-forming carbon atoms, the Z' represents an alkylene group having 1 to 8 carbon atoms, an alkylidene group having 2 to 8 carbon atoms, a cycloalkylene group having 5 to 10 carbon atoms, or a cycloalkylidene group having 5 to 10 carbon atoms, and m represents 0 or 1.

7. The method according to claim 6, wherein n in formula (2) represents 25 to 120.

8. The method according to claim 6, wherein n in formula (2) represents 70 to 120.

9. The method according to claim 1, wherein the alkaline compound in said alkaline compound aqueous solution is an alkaline inorganic compound.

10. The method according to claim 9, wherein the alkaline inorganic compound is an alkali metal hydroxide.

11. The method according to claim 9, wherein the alkaline inorganic compound is an alkaline earth metal hydroFxide.

* * * * *